United States Patent
Sarangshar

(10) Patent No.: US 9,152,428 B2
(45) Date of Patent: Oct. 6, 2015

(54) ALTERNATIVE BOOT PATH SUPPORT FOR UTILIZING NON-VOLATILE MEMORY DEVICES

(71) Applicant: Nitin V. Sarangshar, Portland, OR (US)

(72) Inventor: Nitin V. Sarangshar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 316 days.

(21) Appl. No.: 13/631,548

(22) Filed: Sep. 28, 2012

(65) Prior Publication Data

US 2014/0095853 A1 Apr. 3, 2014

(51) Int. Cl.
G06F 9/30 (2006.01)
G06F 9/44 (2006.01)

(52) U.S. Cl.
CPC .................. *G06F 9/4401* (2013.01)

(58) Field of Classification Search
CPC ...................................................... G06F 9/4401
USPC ............................................................. 713/2
See application file for complete search history.

(56) References Cited

U.S. PATENT DOCUMENTS

| | | | |
|---|---|---|---|
| 5,912,839 A | 6/1999 | Ovshinsky et al. | |
| 7,590,918 B2 | 9/2009 | Parkinson | |
| 7,908,417 B2 * | 3/2011 | Cho | 710/300 |
| 7,984,284 B2 * | 7/2011 | Le et al. | 713/2 |
| 8,300,825 B2 | 10/2012 | Sarangdhar et al. | |
| 8,646,052 B2 | 2/2014 | Vembu et al. | |
| 8,782,401 B2 | 7/2014 | Sarangdhar et al. | |
| 8,838,935 B2 | 9/2014 | Hinton | |
| 2008/0270811 A1 | 10/2008 | Chow et al. | |
| 2010/0146255 A1 | 6/2010 | Luo | |
| 2010/0291867 A1 | 11/2010 | Abdulla et al. | |
| 2010/0293317 A1 | 11/2010 | Confalonieri et al. | |

(Continued)

FOREIGN PATENT DOCUMENTS

| | | |
|---|---|---|
| KR | 20080011053 | 1/2008 |
| WO | 2013048519 A1 | 4/2013 |
| WO | 2013095387 A1 | 6/2013 |

OTHER PUBLICATIONS

Lee et al, "Architecting Phase Change Memory as a Scalable DRAM Alternative", ISCA '09, Jun. 20, 2009, 12 pgs., Austin, Texas, USA.

(Continued)

*Primary Examiner* — Albert Wang
(74) *Attorney, Agent, or Firm* — Blakely, Sokoloff, Taylor & Zafman LLP

(57) ABSTRACT

Embodiments of the invention describe apparatuses, systems and method for particularly to providing alternative boot paths for computing devices. In embodiments of the invention, a non-volatile controller subsystem is powered up by default in order to allow memory operations to one or more non-volatile devices prior to PCIe/USB enumeration. Logic such as a system SPI controller receives a request to access an SPI flash device for executing a firmware image instruction; however, embodiments of the invention either do not include or do not utilize an SPI flash device. Instead of notifying an SPI flash device, the host SPI controller redirects this request to the non-volatile controller subsystem. The non-volatile controller accesses one or more non-volatile device(s) for executing the firmware image instruction. Furthermore, embodiments of the invention may also support the protection of storage operations initiated from the host controller to the non-volatile device from hardware attacks.

10 Claims, 6 Drawing Sheets

(56) References Cited

U.S. PATENT DOCUMENTS

| | | |
|---|---|---|
| 2010/0306446 A1 | 12/2010 | Villa et al. |
| 2010/0306453 A1 | 12/2010 | Doller |
| 2010/0318718 A1 | 12/2010 | Eilert et al. |
| 2011/0090897 A1 | 4/2011 | Johnson et al. |
| 2011/0134685 A1 | 6/2011 | Kau et al. |
| 2012/0110246 A1 | 5/2012 | Rolandi et al. |
| 2012/0151223 A1 | 6/2012 | Conde Margues et al. |
| 2014/0095855 A1 | 4/2014 | Huynh et al. |
| 2014/0223198 A1 | 8/2014 | Saranghar et al. |

OTHER PUBLICATIONS

Condit et al., "Better I/O Through Byte-Addressable, Persistent Memory", SOSP '09, Oct. 11, 2009, pp. 133-146. Big Sky, Montana, USA.

Freitas et al., "Storage-class memory: The next storage system technology", IBM J. Res. & Dev., Jul./Sep. 2008, pp. 439-447, vol. 52, No. 4/5.

Akel et al., "Onyx: A Prototype Phase Change Memory Storage Array",www.flashmemorysummit.com/.../Proceeding_2011/08/11_S301_Akel.pdf, 5 pgs.

Mearian, "IBM announces computer memory breakthrough Phase-change memory offers 100 times the write performance of NAND flash", Jun. 30, 2011, 3 pgs.

Caulfield et al., "Moneta: A High-performance Storage Array Architecture for Next-generation, Non-volatile Memories", MICRO 43: Proceedings of the 43rd Annual IEEE/ACM International Symposium on Microarchitecture, Atlanta, GA Dec. 2010 pp. 385-395.

"The Non-Volatile Systems Laboratory Coding for non-volatile memories", http://nvsl.ucsd.edu/ecc, printed Sep. 1, 2011. 2 pgs.

"Phase change memory-based 'moneta' system points to the future of computer storage", ScienceBlog, Jun. 2, 2011, 7 pgs.

Quereshi et al., "Scalable High Performance Main Memory System Using Phase-Change Memory Technology", ISCA '09, Jun. 20, 2009, 10 pgs., Austin, Texas, USA.

Bailey et al., "Operating System Implications of Fast, Cheap, Non-Volatile Memory" 13th USENIX, HOTOS11 2011, May 9-11, 2011, 5 pgs.

Raoux et al., "Phase-change random access memory: A scalable technology", IBM J. Res. & Dev., Jul./Sep. 2008, pp. 465-479, vol. 52, No. 4/5.

Chen et al., "Rethinking Database Algorithms for Phase Change Memory", 5th Biennial Conference on Innovative Data Systems Research (CIDR '11), Jan. 9, 2011, 11 pgs., Asilomar, California, USA.

Jacob et al., "The Memory System You Can't Avoid It, You Can't Ignore It, You Can't Fake It", 2009, 77 pgs., Morgan & Claypool.

Mogul et al., "Operating System Support for NVM+DRAM Hybrid Main Memory", 12th Workshop on Hot Topics in Operating Systems (HatOS XII), May 18, 2009, 9 pgs.

PCT International Search Report for PCT Counterpart Application No. PCT/US2013/047396, 3 pgs., (Oct. 7, 2013).

PCI Express Base Specification, Revision 3, Nov. 10, 2010, pp. 1-159.

PCI Express Base Specification, Revision 3, Nov. 10, 2010, pp. 160-284.

PCI Express Base Specification, Revision 3, Nov. 10, 2010, pp. 285-428.

PCI Express Base Specification, Revision 3, Nov. 10, 2010, pp. 429-553.

PCI Express Base Specification, Revision 3, Nov. 10, 2010, pp. 554-706.

PCI Express Base Specification, Revision 3, Nov. 10, 2010, pp. 707-860.

Universal Serial Bus 3.0 Specification—including errata and ECNs through May 1, 2011, Revision 1.0, Jun. 6, 2011, Cover Page To p. 6-10, (150 pages).

Universal Serial Bus 3.0 Specification —including errata and ECNs through May 1, 2011, Revision 1.0, Jun. 6, 2011, pp. 6-11 to 8-57 (151 pages).

Universal Serial Bus 3.0 Specification —including errata and ECNs through May 1, 2011, Revision 1.0, Jun. 6, 2011, pp. 8-58 to 10-63 (151 pages).

Universal Serial Bus 3.0 Specification —including errata and ECNs through May 1, 2011, Revision 1.0, Jun. 6, 2011, pp. 10-64 to D-2 (79 pages).

\* cited by examiner

250

Perform platform hardware initialization
252

Power up pre-enumeration PCIe/PCMS controller subsystem
254

Receive request to access SPI flash device for executing firmware image instruction
256

Redirect request to pre-enumeration PCIe / PCMS controller
258

Access PCMS device(s) to execute firmware image instruction
260

Execute platform boot / USB enumeration operations
262

During runtime, redirect SPI flash operations to pre-enumeration PCIe/PCMS controller and support post-enumration operations via USB/PCMS controller
264

FIG. 2B

ALTERNATIVE BOOT PATH SUPPORT FOR UTILIZING NON-VOLATILE MEMORY DEVICES

FIELD

Embodiments of the invention generally pertain computing devices and more particularly to providing alternative boot paths for computing devices.

BACKGROUND

Computing devices commonly use Serial Peripheral Interface (SPI) flash devices for firmware image storage; however as the demand for faster and more efficient device performance increases, the performance of SPI flash devices becomes a limiting factor. Other types of memory devices are capable of performing faster and more efficiently than existing SPI flash solutions. What is needed is a solution to support different types of non-volatile memory storage (i.e., flash and non-flash devices) for firmware images with minimal changes to the platform hardware design of a computing device.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 2A-FIG. 2B are flow diagrams for supporting non-volatile memory devices for firmware image storage according to embodiments of the invention.

Figure 1:
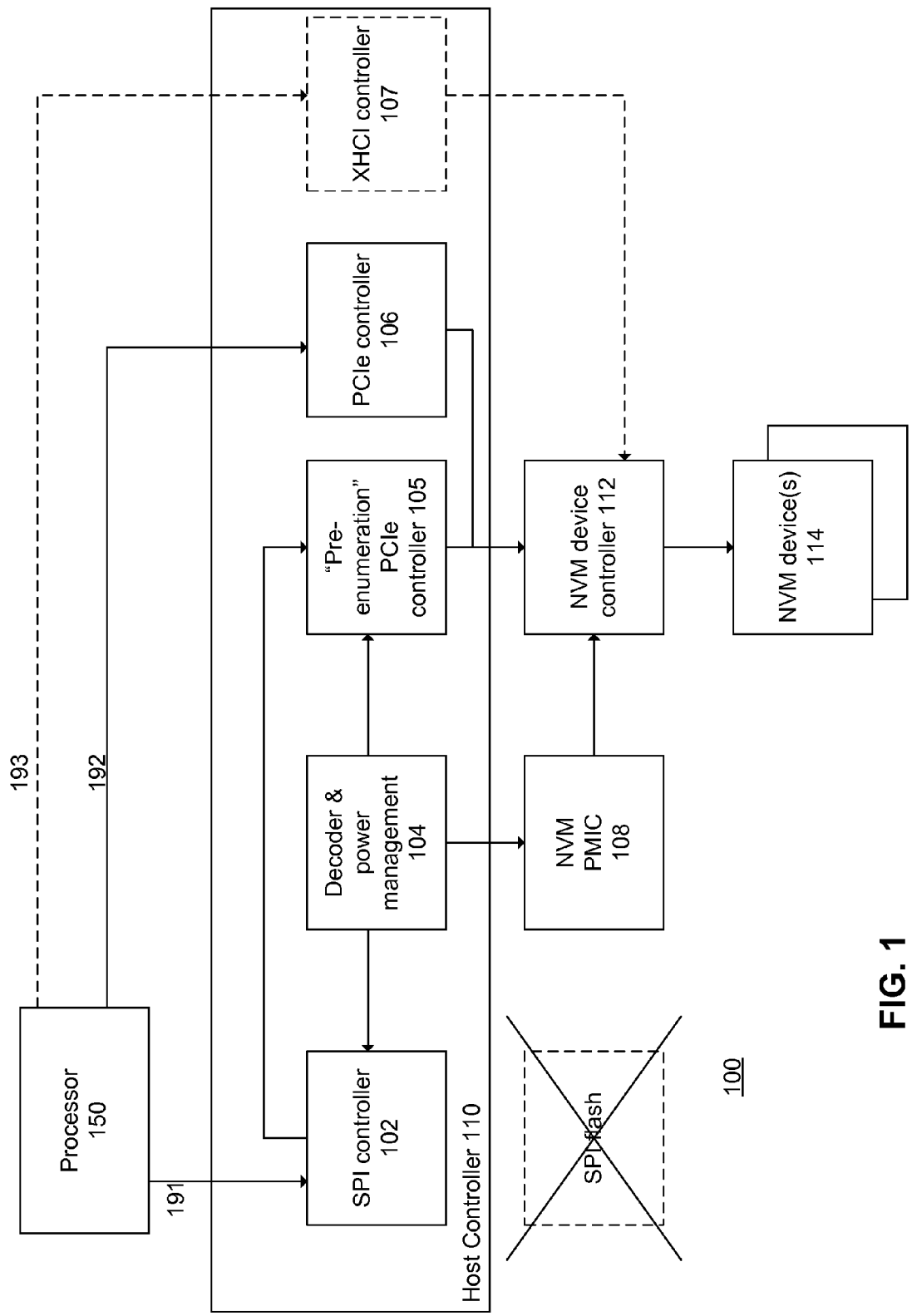
FIG. 1 is a block diagram of platform system components according to an embodiment of the invention.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DESCRIPTION

Embodiments of the invention describe apparatuses, systems and method for providing alternative boot path support for non-volatile (i.e., persistent) memory devices. In embodiments of the invention, a persistent memory device controller is powered up by default in order to allow memory operations directed to one or more persistent memory devices prior to Peripheral Component Interconnect express (PCIe) enumeration or Universal Serial Bus (USB) enumeration. Said persistent memory devices comprise non-volatile memory, such as, NAND flash memories and NOR flash memories; in some embodiments, said persistent memory devices comprise other types of memory with improved operating speed and expected lifetimes compared to flash, such as Phase Change Memories (PCM), PCM comprised of arrays of phase change memory cells and switches (PCMS), silicon nanowire-based non-volatile memory cells, and ferroelectric transistor random access memory (FeTRAM) (i.e., silicon nanowires with a "ferroelectric" polymer, a material that switches polarity when electric fields are applied).

A system Serial Peripheral Interface (SPI) controller (or alternatively, logic outside said SPI controller) receives a request to access an SPI flash device for executing a firmware image instruction from a host processor; however, embodiments of the invention either do not include or do not utilize an SPI flash device. Instead of notifying an SPI flash device, the host SPI controller redirects this request to a non-volatile memory controller, e.g., a PCIe/eXtensible Host Controller Interface (XHCI)/PCMS controller subsystem. The PCIe/XHCI/PCMS controller accesses one or more PCMS device(s) to allow the host processor to execute the firmware image instruction.

Embodiments of the invention modify initialization code such that, initially, said PCIe/XHCI/PCMS Controller primarily performs reads (e.g., boot path operations). Furthermore, embodiments of the invention may also support the protection of storage operations initiated from host controller (e.g., a Platform Controller Hub (PCH)) to the PCMS device from hardware attacks. Some embodiments utilize added vendor defined commands on the PCIe interface that are supported by the PCIe/XHCI/PCMS controller and new commands on the PCMS device interface to provide end-to-end security without gaps. Said commands may include, for example, commands to program a root key, update a Hash-based Message Authentication Code (HMAC) Key, commands to read a secure monotonic counter, commands to increment a secure monotonic counter, memory read/write/erase, and authenticated memory block write/read/erase commands.

In some embodiments, the standard PCMS device would be accessible as a PCIe device to the CPU software. In such embodiments, said standard PCMS device accesses are managed by the PCIe Controller. The PCIe Controller may in turn use conventional access mechanisms to communicate with the PCMS Controller.

In other embodiments, the standard PCMS device would be accessible as a USB device to the CPU Software. In such embodiments such standard PCMS device accesses are managed by the XHCI Controller. The XHCI Controller may in turn use normal access mechanisms to communicate with the PCMS Controller.

In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 1 is a block diagram of platform system components according to an embodiment of the invention. In this embodiment, system 100 is shown to include a host controller (in this embodiment, PCH 110), having SPI controller 102, decoder and power management logic 104, PCIe controller 106 (e.g., a controller consistent with, for example, The PCI Express Base Specification of the PCI Special Interest Group, Revision 3.0 published Nov. 18, 2010) and XHCI Controller 107 (e.g. a controller consistent with, for example, The USB3.0 Base Specification of the USB Special Interest Group, Revision 3.0 published May 1, 2011. PCH 110 is shown to be communicatively coupled to non-volatile memory Power Management Integrated Circuit (PMIC) 108, non-volatile memory device controller 112 (controlling one or more non-volatile memory devices 114), and processor 150. Said memory devices may comprise, for example, NAND flash memory devices, NOR flash memory devices, PCM and PCMS devices, silicon nanowire-based devices, and FeTRAM devices.

In prior art systems, SPI Flash components contain firmware images for different execution engines. Embodiments of the invention enable platforms to replace an SPI Flash component on the platform with non-volatile memory device(s) 114 for firmware image storage. As described below, embodiments of the invention describe modules and/or logic that may be implemented in various components to enable efficient replacement of said SPI flash components. In this example embodiment, changes in PCH 110 (i.e., SPI controller 102 PCIe Controller 106 and XHCI Controller 107), non-volatile memory device controller 112 and non-volatile memory device(s) 114 are made in order to support a platform configuration without an SPI flash device.

In prior art systems, PCIe and USB based controllers are only operated after the execution of a bus enumeration process. Enumeration processes are typically performed in processor Basic Input/Output System (BIOS) code. Said enumeration processes enable the addressing of PCIe and USB devices by mapping them into the input/output (I/O) port address space or the memory-mapped address space of the system. In other words, prior to enumeration, PCIe and USB devices do not have any addresses assigned to them for communication with platform software (e.g., operating systems (OS), device drivers). Thus, PCIe and USB devices cannot be accessed prior to BIOS operation in prior art solutions.

In this embodiment, host controller 110 is configured so that operations with non-volatile memory device controller 112 are allowed by default via "pre-enumeration" (i.e., legacy) PCIe controller 105. Furthermore, as described below, PCIe controller 105 and non-volatile memory device controller 112 support hardware attack protection for non-volatile memory device(s) 114 by utilizing enhanced protocol definitions on the PCMS device interface and the PCMS controller interface.

For example, in embodiments utilizing PCIe devices, for non-volatile memory device controller 112 to be operational and accessible by processor 150 prior to proper PCI enumeration, system 100 uses a default configuration where BIOS Flash accesses are directed towards SPI controller 102 (shown as request 191). Prior art host controller solutions support a legacy PCIe to legacy bridge where default cycles are transferred to the specific legacy bus. In this embodiment, similar defaults configurations are used for non-volatile memory device controller 112 where BIOS Flash accesses are always directed to the non-volatile memory device controller (because system 100 includes no SPI flash device) using PCIe command protocol. In some embodiments, this configuration is implemented in a bootstrap code that describes to PCH 110 and non-volatile memory device controller 112 that the platform supports a "no SPI flash" configuration—i.e., a strap code that enables the transfer of cycles to SPI controller 102 to PCIe controller 105, and in turn, to a legacy PCI lane (i.e., receiving/transmitting signal pairs). Furthermore, decoder and power management logic 104 is configured such that support for PMIC 108 logic is operational immediately after reset.

Thus, non-volatile memory device controller 112 is configured to accept legacy cycles generated by SPI controller 102 prior to PCIe enumeration. Furthermore, non-volatile memory device controller 112 may be configured to support 4, 8 or more megabytes (MB) of dedicated memory space for firmware storage for reads and writes, include a direct memory mapped interface to support direct memory reads and writes when supplying BIOS or manageability engine (ME) firmware contents, and map reads to the SPI region to the Read-Only Memory Base Address Register (ROMBAR, i.e., option read-only memory (orom)) Memory Mapped I/O (MMIO) space that enable direct reads. In some embodiments, if PCMS controller 112 is unable to locally support read-modify-write operations locally, then the capability is added in components of PCH 110. After enumeration, PCIe based accesses by processor 150 are executed via PCIe controller 106, shown as request 192 (while runtime SPI flash accesses are still redirected via PCIe controller 105). Said PCIe controllers 105 and 106 are shown to be separate logical components for exemplary purposes, and may comprise the same controller in other embodiments.

In alternative embodiments for supporting USB based devices, PCH 110 includes XHCI controller 107 (e.g., a XHCI controller consistent with eXtensible Host Controller Interface Specification for Universal Serial Bus 3.0, revision 1.0 published May 21, 2010) for interacting with one or more USB based non-volatile memory devices (e.g., USB devices consistent with USB Specification 3.0, published Nov. 12, 2008). Similar to embodiments utilizing a PCIe controller as described above, for USB based devices, PCMS controller 112 is operational prior to proper USB enumeration as a pre-enumeration (i.e., legacy) PCIe device, accessible via pre-enumeration PCIe controller 105. After enumeration, USB based accesses by processor 150 are executed via XHCI controller 107, shown as request 193 (while runtime SPI flash accesses are still redirected via PCIe controller 105).

For non-volatile memory device controller 112 to be operational prior to proper USB enumeration, system 100 may use a default configuration where accesses are directed towards SPI controller 102. Prior art PCH solutions support a PCIe to legacy bridge where default cycles are transferred to the appropriate legacy device. In this embodiment, similar defaults configurations are used for non-volatile memory device controller 112 where BIOS SPI Flash accesses are always directed to the non-volatile memory device controller (because system 100 includes no SPI flash device) using the PCIe to legacy PCIe Bridge. In some embodiments, this configuration is implemented in a bootstrap code that describes to PCH 110 and non-volatile memory device controller 112 that the platform supports a "no SPI flash" configuration—i.e., a strap code that enables the transfer of cycles to SPI controller 102 to PCIe Controller 105, XHCI controller 107, and in turn, to one or more of non-volatile memory device(s) 114. Furthermore, as described below, XHCI controller 107 and non-volatile memory device controller 112 support hardware attack protection for non-volatile memory device(s) 114 by utilizing enhanced protocol definitions on the XHCI device interface and the non-volatile memory device controller interface. Furthermore, non-volatile memory device controller 112 may be configured to support 4, 8 or more megabytes (MB) of carved out space for firmware storage for reads and writes, include a direct memory mapped interface to support direct memory reads and writes when supplying BIOS or manageability engine (ME) firmware contents, and map reads to the SPI region to the ROMBAR (orom) MMIO space that enable direct reads. In some embodiments, if non-volatile memory device controller 112 is unable to locally support read-modify-write operations locally, then the capability is added in components of PCH 110.

Thus, in this embodiment, controllers 105 and 106 are executed to support the pre-enumeration and post-enumeration PCIe device accesses described above, and controllers 105 and 107 are executed to support the pre-enumeration and post-enumeration USB device accesses described above.

Figure 2A:
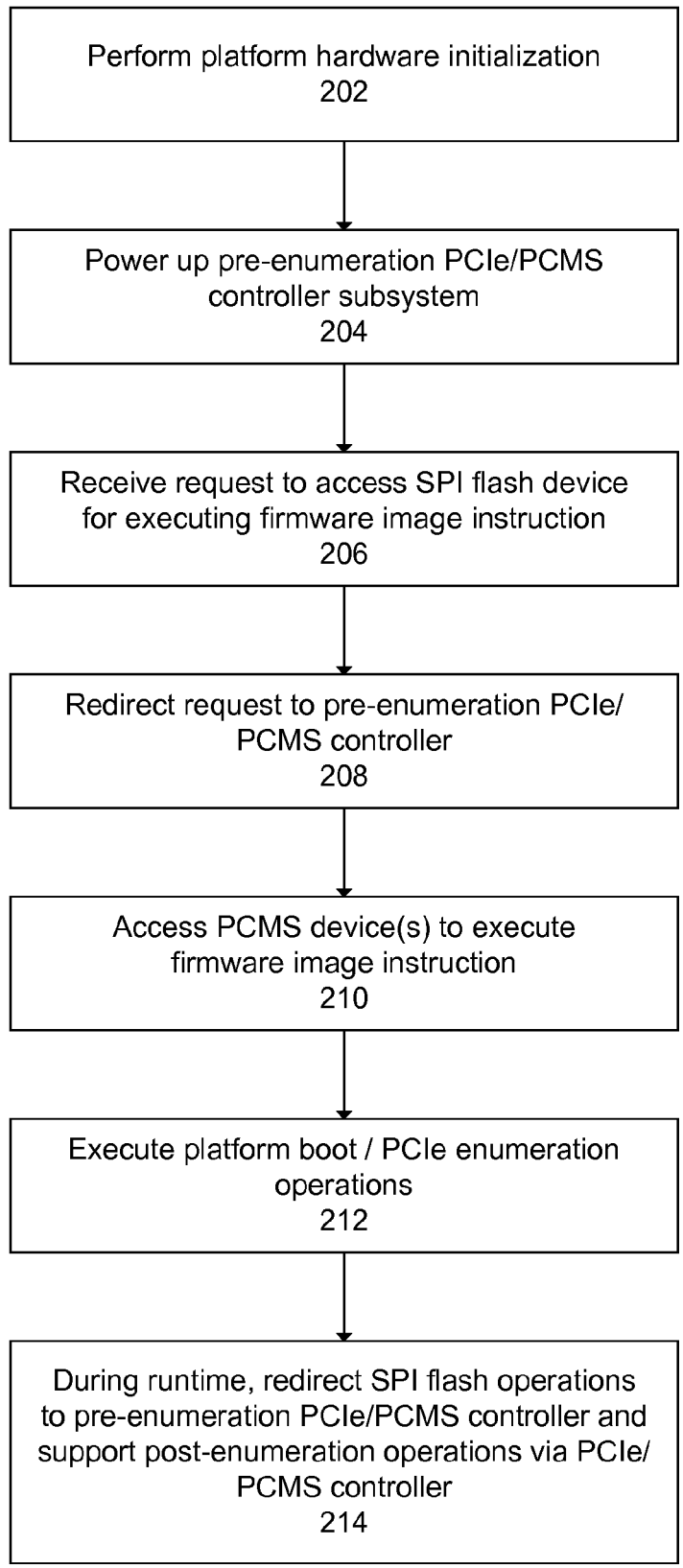

FIG. 2A is a flow diagram for supporting persistent storage memory devices for firmware image storage according to an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

Process 200 includes performing operations for platform hardware initialization, 202. As described above, platform modules and logic are configured to execute the operations described below during initialization by utilizing persistent storage memory devices. In the operations described below, PCM memory devices are discussed for exemplary purposes only, as discussed above, other types of non-volatile memory may be utilized in other embodiments of the invention. A legacy (i.e., pre-enumeration) PCIe/PCMS controller subsystem is powered up by default, 204, to allow memory operations to one or more PCMS devices prior to PCIe enumeration for PCIe-based PCMS devices.

The host SPI controller receives a request to access an SPI flash device for executing a firmware image instruction, 206. Instead of notifying an SPI flash device, the host SPI controller redirects this request to the legacy PCMS controller, 208. The PCMS controller accesses the PCMS device(s) for executing the firmware image instruction, 210.

Boot operations may then be executed transparently regardless of the location of the firmware image, 212, resulting in a platform OS boot. These boot operations may include a descriptor read, an Embedded Controller (EC) firmware read, a ME firmware read and a CPU BIOS read; the CPU bios may further enumerate the PCIe PCMS controller and allow reads, writes and other peripheral device operations (e.g., Solid-State Drive (SSD) device management operations such as clean-up and management operations for PCIe PCM SSD devices) to the PCMS controller. In some embodiments, the BIOS is modified to delay writes to persistent storage devices (including said PCMS device) up to this point. During runtime, post OS boot, the runtime storage operations are similarly redirected to the PCMS controller, 214; furthermore, post OS boot, post-enumeration PCIe operations are also supported for the PCIe PCMS device.

Thus, embodiments of the invention modify initialization code such that initially PCMS controller receives primarily reads. PCIe enumeration is completed and then writes are issued to the PCMS controller and the device supports standard post-enumeration PCMS accesses in addition to legacy PCIe operations for SPI flash accesses.

In addition to the non-SPI device support described above, embodiments of the invention may also support the protection of storage operations initiated from the PCH to the PCMS device from hardware attacks. Some embodiments utilize added vendor defined commands on the PCIe/XHCI interface that are supported by the PCMS controller and new commands on the PCMS device interface to provide end-to-end security without gaps.

Said commands may include, for example, commands to program a root key, update an HMAC Key, commands to read a secure monotonic counter (described below), commands to increment a secure monotonic counter, memory read/write/erase, and authenticated memory block write/read/erase commands.

FIG. 2B is a flow diagram for supporting non-volatile memory devices for firmware image storage according to an embodiment of the invention. Process 250 includes performing operations for platform hardware initialization, 252. As described above, platform modules and logic are configured to execute the operations described below during initialization. A legacy (i.e., pre-enumeration) PCIe/PCMS controller subsystem is powered up by default, 254, to allow memory operations to one or more USB devices prior to the execution of a USB device enumeration process (i.e., during a boot-up process).

In this embodiment, the host SPI controller receives a request to access an SPI flash device for executing a firmware image instruction, 256. Instead of notifying an SPI flash device, the host SPI controller redirects this request to the legacy PCIe/PCMS controller, 258. This controller accesses the PCMS device(s) for executing the firmware image instruction, 260.

Legacy boot operations may then be executed transparently regardless of the location of the firmware image, 262, resulting in a platform OS boot. These boot operations may include a descriptor read, an Embedded Controller (EC) firmware read, a ME firmware read and a CPU BIOS read; the CPU BIOS may further enumerate USB devices and allow reads, writes and SSD device management operations to the PCMS controller. In some embodiments, the BIOS is modified to delay writes to persistent storage up to this point. During runtime, post OS boot, the runtime storage operations are similarly redirected to the PCMS controller, 264; furthermore, post OS boot, post-enumeration USB operations are also supported, thereby configuring the device to perform as a PCIe/USB/PCMS device.

Thus, embodiments of the invention modify initialization code such that initially PCMS controller sees primarily reads. PCIe (or alternatively, USB) enumeration is completed and then writes are issued to the PCMS controller and the device supports standard USB/PCMS accesses in addition to legacy PCIe operations for SPI flash accesses.

In addition to the non-SPI device support described above, embodiments of the invention may also support the protection of storage operations initiated from the PCH to the PCMS device from hardware attacks. Some embodiments utilize added vendor defined commands on the PCIe/XHCI interface that are supported by the PCMS controller and new commands on the PCMS device interface to provide end-to-end security without gaps.

Said commands may include, for example, commands to program a root key, update an HMAC Key, commands to read a secure monotonic counter (described below), commands to increment a secure monotonic counter, memory read/write/erase, and authenticated memory block write/read/erase commands.

Figure 3:
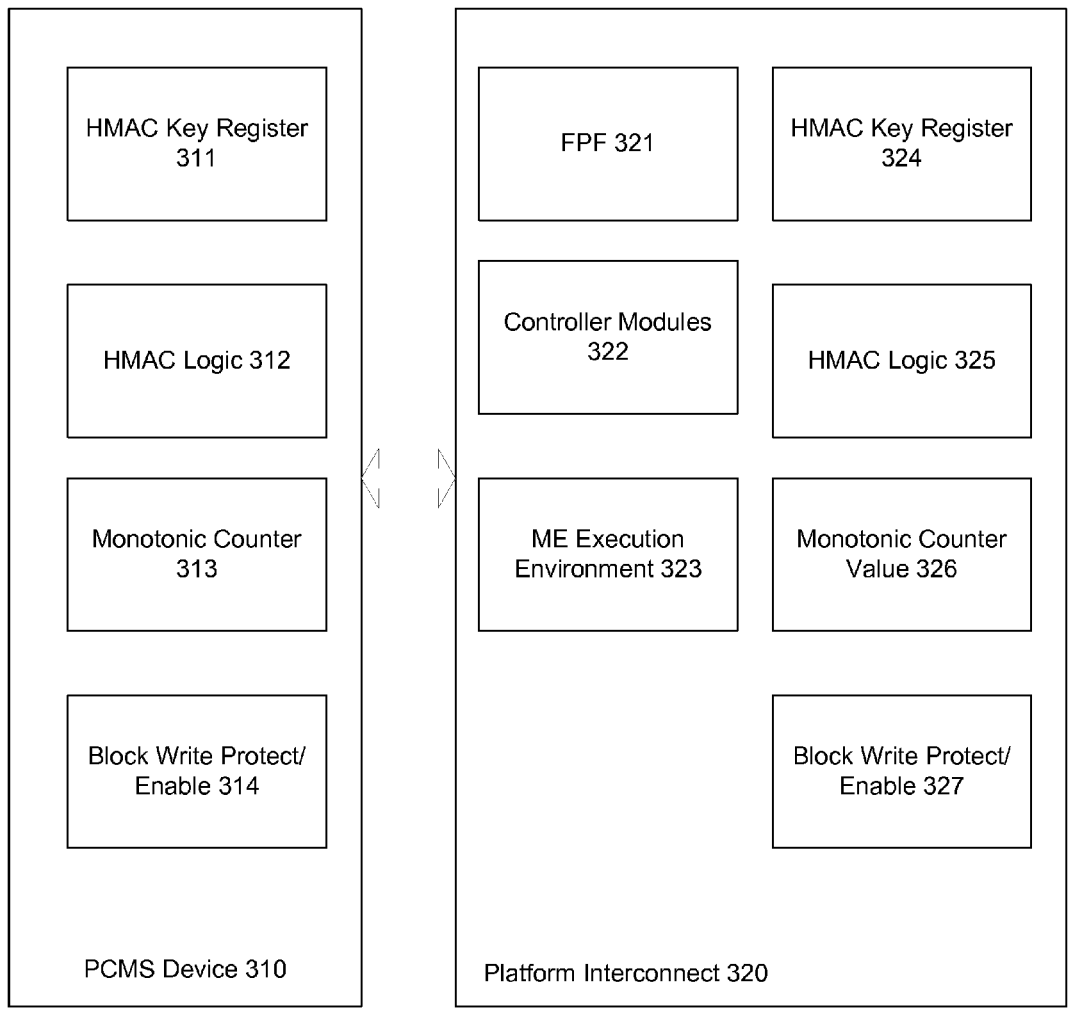
FIG. 3 is a block diagram of system components for supporting non-volatile memory devices for firmware image storage according to an embodiment of the invention.

FIG. 3 is a block diagram of system components for supporting non-volatile memory devices for firmware image storage according to an embodiment of the invention. System 300 is shown to include a non-volatile memory device (in this embodiment, PCMS memory device 310) and platform interconnect 320 (e.g., a PCH including a PCIe/XHCI/PCMS controller). In this embodiment, PCMS memory device 310 communicates with platform interconnect 320 using a combination of PCMS and SPI flash controllers as described above (shown in this illustration as controller modules 322); in other embodiments, other non-volatile memory devices and protocols may be used as described below.

PCMS memory device 310 includes HMAC key register 311, HMAC logic 312, monotonic counter 313, and block write protection logic 314 that disables/enables writing to the memory of the PCMS memory device. HMAC key register 311 may store one or more device HMAC keys received from platform interconnect 320. In one embodiment, HMAC key register 311 is non-readable, and said device HMAC key is permanently written to said register. HMAC logic 312 shall verify authenticated commands received from platform interconnect 320, and shall also generate authenticated responses to said commands, utilizing the above described device HMAC key. In one embodiment, said HMAC logic utilizes a Hash-based Message Authentication Code/Secure Hash Algorithm (HMAC-SHA) algorithm for authenticating requests and generating responses (e.g., an HMAC-SHA-256 signing algorithm). In other embodiments, any other similar signing algorithm may be utilized.

Monotonic counter (or counters) 313 represents hardware storage of a monotonic counter value. Said monotonic counter may be configured to count (e.g., increment or decrement) when requested to do so, and to produce a monotonic count value in response to a read operation to the counter.

Platform interconnect 320 includes field programmable fuses (FPF) 321, controller modules 322, ME execution environment 323, HMAC key register 324, HMAC logic 325, monotonic counter logic 326, and block write protection logic 327. ME execution environment 323 provides a secure and isolated environment that may not be accessed, for example, by the host operating system. Said ME may, for example, authenticate users and control access to peripheral devices (not shown).

Platform interconnect 320 may have a unique device key based, which may be a set of fuses blown to derive a unique device key (blown, for example, during a manufacturing process). In embodiments utilizing HMAC-SHA based messaging, said unique device key may be used to derive a unique HMAC Key stored in HMAC key register 324. During a printed circuit board (PCB) manufacturing process, the unique HMAC key is provisioned into the PCMS using a Root key register write command. This key is written only one time and establishes a common secret between the platform interconnect 320 and PCMS 310. In one instantiation HMAC based commands and responses exchanged between PCMS memory device 310 and platform interconnect 320, as described below, ensure the storage of replay protected data in said PCMS memory device. In a different instantiation the HMAC Root key is stored similar to the first instantiation, but during actual operation an HMAC Operational key is derived based on HMAC root key using an HMAC command operation.

Embodiments of the invention modify PCMS memory device 310 by providing a replay protected monotonic counter storage mechanism. This is created by provisioning a common HMAC key exchanged between PCMS memory device 310 and platform interconnect 320 and stored, for example, in HMAC key registers 311 and 324. In this embodiment, all commands that manipulate monotonic counter 313 are authenticated commands. Since authenticated commands can only be issued by the owner of the device key (in this embodiment, the ME execution environment 323 and PCMS memory device 310) no other entity is able to access the monotonic counters in order to read and/or manipulate the counter.

Figure 4:
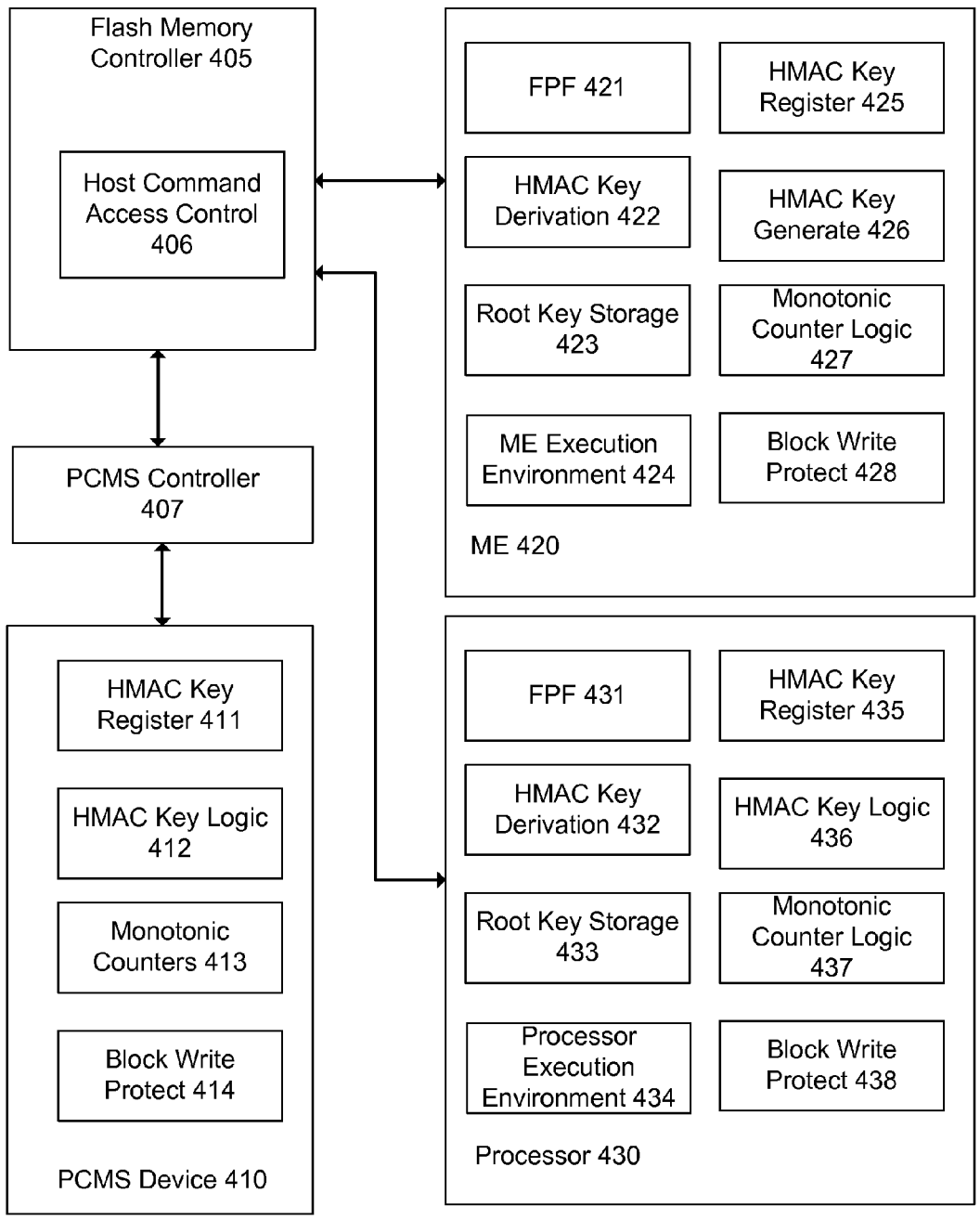
FIG. 4 is a block diagram of system components for enabling secure key and counter operations for non-volatile memory devices according to an embodiment of the invention.

FIG. 4 is a block diagram of system components for enabling secure key and counter operations for non-volatile memory devices according to an embodiment of the invention. In this embodiment, system 400 includes a non-volatile memory device (in this embodiment, PCMS memory device 410) that supports multiple replay protected monotonic counters. Each individual monotonic counter is available as a resource for an individual secure execution environment for various devices on the host platform. Embodiments of the invention isolate and protect the different secure execution environments from accessing monotonic counter resources that do not belong to them, in addition to protecting the counters from user attack.

PCMS device 410 includes HMAC key register 411, HMAC Key logic 412, monotonic counters 413, and block write protection logic 414. HMAC key register 411 may store one or more HMAC keys received from ME logic 420 and processor 430 (described below). Said HMAC keys may be associated with a specific monotonic counter. In one embodiment, HMAC key register 411 is non-readable. HMAC logic 412 may verify monotonic counter request commands received from ME 420 and processor 430, and may also generate authenticated responses to said commands.

Monotonic counters 413 may be hardware storage for a plurality of counter values. Said monotonic counters may also be configured to count (e.g., increment or decrement) when requested to do so, and to produce a monotonic count value in response to a read operation.

SPI flash controller 405 includes host command access control 406 to receive requests from the various components of system 400 and forward said requests to PCMS controller 407 (via a PCIe or XHCI controller) as discussed above.

ME 420 includes FPF 421, HMAC key derivation 422, root key storage 423, ME execution environment 424, HMAC key register 425, HMAC Key Generate logic 426, monotonic counter logic 427, and block write protect 428. HMAC key derivation 422 may derive an HMAC key using the root key stored in root key storage 423 (said root key may be further derived from device key based on blown fuses of FPF 421). HMAC key register 425 may store said HMAC keys, and HMAC logic 426 may authenticate requests and commands to the monotonic counter assigned to ME 420.

Monotonic counter logic 427 may store retrieved values of its respective monotonic counter (i.e., one of monotonic counters 413) and may also store the address of its respective monotonic counter; thus SPI flash controller 405 forwards monotonic counter requests from ME 420 that are directed to the correct address to PCMS controller 407, thus ensuring that ME execution environment 424 does not access unrelated monotonic counters.

Processor 430 includes FPF 431, HMAC key derivation 432, root key storage 433, processor execution environment 434, HMAC key register 435, HMAC key logic 436, monotonic counter logic 437, and block write protect 438. Processor execution environment 434 may be a secure execution environment accessible by the host system OS.

HMAC key derivation 432 may derive an HMAC key using the root key stored in root key storage 433 (said root key may be further be derived from device keys based on blown fuses of FPF 431). HMAC key register 435 may store said HMAC keys, and HMAC key logic 436 may authenticate requests and commands to the monotonic counter assigned to processor 430.

Monotonic counter logic 437 may store retrieved values of its respective monotonic counter (i.e., one of monotonic counters 413) and may also store the address of its respective monotonic counter; thus SPI flash controller 405 may only forward monotonic counter requests from processor 430 to PCMS controller 407 that are directed to the correct address, thus ensuring that processor execution environment 434 does not access unrelated monotonic counters.

Figure 5:
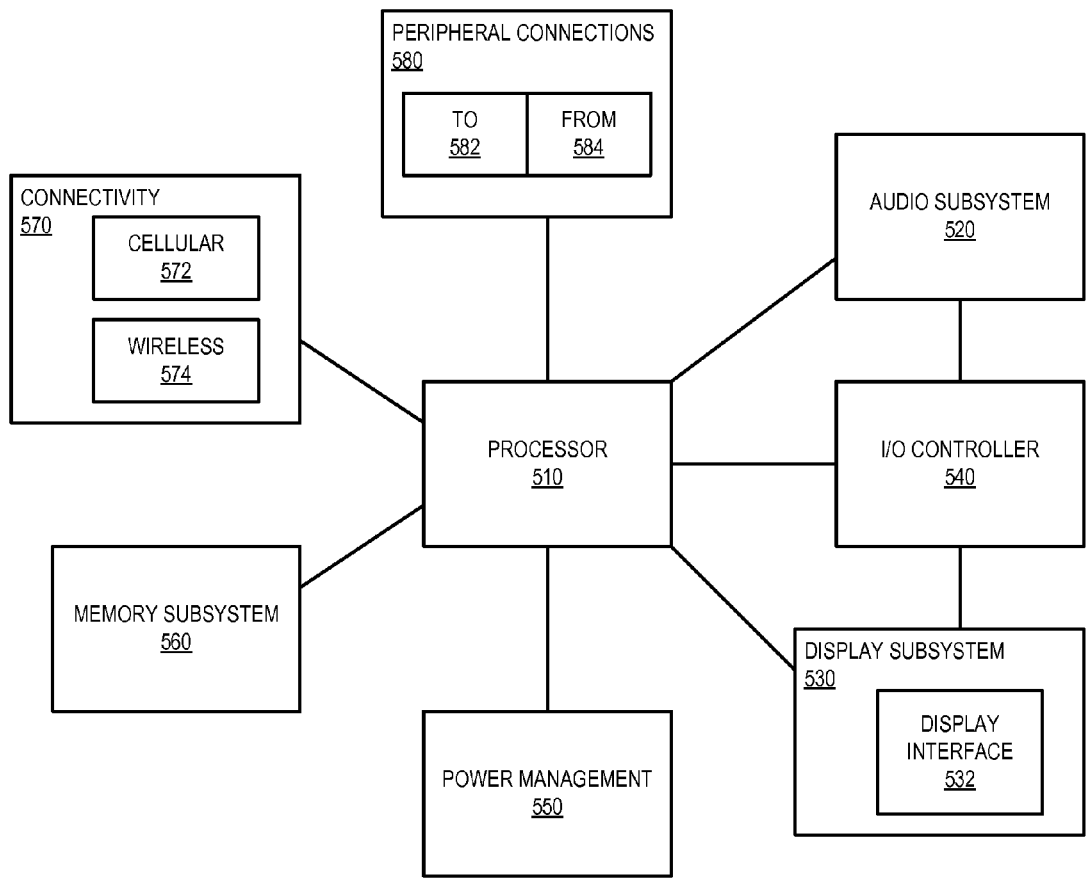
FIG. 5 is a block diagram of a client device for utilizing non-volatile storage devices according to an embodiment of the invention.

FIG. 5 is a block diagram of a client device for utilizing non-volatile firmware storage devices according to an embodiment of the invention. Computing device 500 represents a mobile computing device, such as a laptop computer, an ultrabook, a computing tablet, a mobile phone or smartphone, a wireless-enabled e-reader, or other wireless mobile device. It will be understood that certain of the components are shown generally, and not all components of such a device are shown in device 500.

Device 500 includes processor 510, which performs the primary processing operations of device 500. Processor 510 can include one or more physical devices, such as microprocessors, application processors, microcontrollers, programmable logic devices, processor cores, or other processing means. The processing operations performed by processor 510 include the execution of an operating platform or operating system on which applications and/or device functions are executed. The processing operations include operations related to I/O (input/output) with a human user or with other devices, operations related to power management, and/or operations related to connecting device 500 to another device. The processing operations may also include operations related to audio I/O and/or display I/O.

In one embodiment, device 500 includes audio subsystem 520, which represents hardware (e.g., audio hardware and audio circuits) and software (e.g., drivers, codecs) components associated with providing audio functions to the computing device. Audio functions can include speaker and/or headphone output, as well as microphone input via any of the audio jacks described above. Devices for such functions can be integrated into device 500, or connected to device 500. In one embodiment, a user interacts with device 500 by providing audio commands that are received and processed by processor 510.

Display subsystem 530 represents hardware (e.g., display devices) and software (e.g., drivers) components that provide a visual and/or tactile display for a user to interact with the computing device. Display subsystem 530 includes display interface 532, which includes the particular screen or hardware device used to provide a display to a user. In one embodiment, display interface 532 includes logic separate from processor 510 to perform at least some processing related to the display. In one embodiment, display subsystem 530 includes a touchscreen device that provides both output and input to a user.

I/O controller 540 represents hardware devices and software components related to interaction with a user. I/O controller 540 can operate to manage hardware that is part of audio subsystem 520 and/or display subsystem 530. Additionally, I/O controller 540 illustrates a connection point for additional devices that connect to device 500 through which a user might interact with the system. For example, devices that can be attached to device 500 might include microphone devices, speaker or stereo systems, video systems or other display device, keyboard or keypad devices, or other I/O devices for use with specific applications such as card readers or other devices.

As mentioned above, I/O controller 540 can interact with audio subsystem 520 and/or display subsystem 530. For example, input through a microphone or other audio device can provide input or commands for one or more applications or functions of device 500. Additionally, audio output can be provided instead of or in addition to display output. In another example, if display subsystem includes a touchscreen, the display device also acts as an input device, which can be at least partially managed by I/O controller 540. There can also be additional buttons or switches on device 500 to provide I/O functions managed by I/O controller 540.

In one embodiment, I/O controller 540 manages devices such as accelerometers, cameras, light sensors or other environmental sensors, or other hardware that can be included in device 500. The input can be part of direct user interaction, as well as providing environmental input to the system to influence its operations (such as filtering for noise, adjusting displays for brightness detection, applying a flash for a camera, or other features). In one embodiment, device 500 includes power management 550 that manages battery power usage, charging of the battery, and features related to power saving operation.

Memory subsystem 560 includes memory devices for storing information in device 500. Memory can include nonvolatile (state does not change if power to the memory device is interrupted) and/or volatile (state is indeterminate if power to the memory device is interrupted) memory devices. Memory 560 can store application data, user data, music, photos, documents, or other data, as well as system data (whether long-term or temporary) related to the execution of the applications and functions of system 500. Memory 560 further stores firmware images related to boot path operations, and thus may include persistent storage devices to store said firmware images as described above.

Connectivity 570 includes hardware devices (e.g., wireless and/or wired connectors and communication hardware) and software components (e.g., drivers, protocol stacks) to enable device 500 to communicate with external devices. The device could be separate devices, such as other computing devices, wireless access points or base stations, as well as peripherals such as headsets, printers, or other devices.

Connectivity 570 can include multiple different types of connectivity. To generalize, device 500 is illustrated with cellular connectivity 572 and wireless connectivity 574. Cellular connectivity 572 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity 574 refers to wireless connectivity that is not cellular, and can include personal area networks (such as Bluetooth), local area networks (such as Wi-Fi), and/or wide area networks (such as Wi-Max), or other wireless communication.

Peripheral connections 580 include hardware interfaces and connectors for implementing non-volatile memory device firmware storage support as described above, as well as software components (e.g., drivers, protocol stacks) to make peripheral connections. It will be understood that device 500 could both be a peripheral device ("to" 582) to other computing devices, as well as have peripheral devices ("from" 584) connected to it. Device 500 commonly has a "docking" connector to connect to other computing devices for purposes such as managing (e.g., downloading and/or uploading, changing, synchronizing) content on device 500. Additionally, a docking connector can allow device 500 to connect to certain peripherals that allow device 500 to control content output, for example, to audiovisual or other systems.

In addition to a proprietary docking connector or other proprietary connection hardware, device 500 can make peripheral connections 580 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

Thus, embodiments of the invention describe systems including an antenna, radio frequency circuitry coupled to the antenna to receive signal data to be processed by the system, a non-volatile memory device including a firmware image, a processor and a host controller. Said host controller includes a peripheral device controller, and a Serial Peripheral Interface (SPI) flash controller to receive a request from the processor to access an SPI flash device for executing a firmware image instruction, and to notify the peripheral device controller of the received request. Said peripheral device controller of the host controller is to access the non-volatile memory device for the processor to execute the firmware instruction in response to receiving the notification from the peripheral device controller of the received request. In some embodiments, said peripheral device controller comprises one of a Peripheral Component Interconnect express (PCIe) controller or an eXtensible Host Controller Interface (XHCI) controller.

Said firmware instruction may comprise, for example, one of a memory read, a memory write, a memory erase request, an authenticated memory block access command, an update of a Hash-based Message Authentication Code (HMAC) key, a request for a value of a monotonic counter, or a request to update a monotonic counter. In some embodiments, said non-volatile memory device comprises a PCMS device, and the peripheral device controller is to access the PCMS device via a PCMS controller external to the host controller.

Embodiments of the invention describe methods including operations for redirecting a request from a processor to a peripheral device controller, the request from the processor to comprise a request to access a Serial Peripheral Interface (SPI) flash device for executing a firmware instruction, and accessing, via the peripheral device controller, a non-volatile memory device including a firmware image having the firmware image instruction. Said peripheral device controller may comprise one of a Peripheral Component Interconnect express (PCIe) controller or an eXtensible Host Controller Interface (XHCI) controller.

Said firmware instruction may comprise, for example, one of a memory read, a memory write, a memory erase request, an authenticated memory block access command, an update of a Hash-based Message Authentication Code (HMAC) key, a request for a value of a monotonic counter, or a request to update a monotonic counter. In some embodiments, said non-volatile memory device comprises a PCMS device, and the peripheral device controller is to access the PCMS device via a PCMS controller external to the host controller.

Embodiments of the invention describe apparatuses comprising a peripheral device controller and host controller logic; said controller logic is to receive a request to access a Serial Peripheral Interface (SPI) flash device for executing a firmware image instruction, and to notify the peripheral device controller of the received request. The peripheral device controller is to access a non-volatile memory device including a firmware image in response to receiving the notification from the peripheral device controller of the received request. In some embodiments, said peripheral device controller comprises one of a Peripheral Component Interconnect express (PCIe) controller or an eXtensible Host Controller Interface (XHCI) controller.

Said firmware instruction may comprise, for example, one of a memory read, a memory write, a memory erase request, an authenticated memory block access command, an update of a Hash-based Message Authentication Code (HMAC) key, a request for a value of a monotonic counter, or a request to update a monotonic counter. In some embodiments, said non-volatile memory device comprises a PCMS device, and the peripheral device controller is to access the PCMS device via a PCMS controller external to the host controller logic.

Various components referred to above as processes, servers, or tools described herein may be a means for performing the functions described. Each component described herein includes software or hardware, or a combination of these. Each and all components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

A computer readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable non-transitory storage medium may also include a storage or database from which content can be downloaded. Said computer readable medium may also include a device or product having content stored thereon at a time of sale or delivery. Thus, delivering a device with stored content, or offering content for download over a communication medium may be understood as providing an article of manufacture with such content described herein.

The invention claimed is:

1. A system comprising:
an antenna;
radio frequency circuitry coupled to the antenna to receive signal data to be processed by the system;
a non-volatile memory device comprising a firmware image;
a processor; and
a host controller comprising:
a peripheral device controller; and
a Serial Peripheral Interface (SPI) flash controller to receive a request from the processor to access an SPI flash device for executing a firmware instruction, and to notify the peripheral device controller of the received request, said firmware instruction being any of the following:
a memory read;
a memory write;
a memory erase request;
an authenticated memory block access command;
an update of a Hash-based Message Authentication Code (HMAC) key;
a request for a value of a monotonic counter;
a request to update a monotonic counter;
the peripheral device controller of the host controller to access the non-volatile memory device for the processor to execute the firmware instruction in response to receiving the notification from the SPI flash controller of the received request.

2. The system of claim 1, wherein the peripheral device controller of the host controller comprises one of a Peripheral Component Interconnect express (PCIe) controller or an eXtensible Host Controller Interface (XHCI) controller.

3. The system of claim 1, wherein the non-volatile memory device comprises a Phase Change Memory and Switch (PCMS) device, the system further comprising:
a PCMS controller operatively coupled to the peripheral device controller of the host controller and the PCMS device.

4. A method comprising:
redirecting a request from a processor to a peripheral device controller, the request from the processor to comprise a request to access a Serial Peripheral Interface (SPI) flash device for executing a firmware instruction, said firmware instruction being any of the following:
a memory read;
a memory write;
a memory erase request;
an authenticated memory block access command;
an update of a Hash-based Message Authentication Code (HMAC) key;
a request for a value of a monotonic counter;
a request to update a monotonic counter; and
accessing, via the peripheral device controller, a non-volatile memory device comprising a firmware image, the firmware image the firmware instruction.

5. The method of claim 4, wherein the peripheral device controller comprises one of a Peripheral Component Interconnect express (PCIe) controller or an eXtensible Host Controller Interface (XHCI) controller.

6. An apparatus comprising:
a peripheral device controller; and
host controller logic to redirect a received request to the peripheral device controller, the received request comprising a request to access a Serial Peripheral SPI flash device to retrieve a firmware instruction, said firmware instruction being any of the following:
a memory read;
a memory write;
a memory erase request;
an authenticated memory block access command;
an update of a Hash-based Message Authentication Code (HMAC) key;
a request for a value of a monotonic counter;
a request to update a monotonic counter;
the peripheral device controller to access a non-volatile memory device comprising a firmware image, the firmware image comprising the firmware image instruction, in response to receiving notification from the host controller logic of the received request.

7. The apparatus of claim 6, wherein the peripheral device controller comprises one of a Peripheral Component Interconnect express (PCIe) controller or an eXtensible Host Controller Interface (XHCI) controller.

8. The apparatus of claim 6, wherein the non-volatile memory device comprises a Phase Change Memory and Switch (PCMS) device, the peripheral device controller to access the PCMS device via a PCMS controller external to the host controller logic.

9. An apparatus, comprising:
circuitry to direct a boot instruction written for a BIOS flash memory coupled to a serial peripheral interface (SPI) to a non SPI interface that is coupled to a non-flash, non-volatile memory.

10. The apparatus of claim 9 further comprising boot information that indicates the apparatus is to operate in a no SPI flash configuration.

* * * * *